US008605189B2

(12) United States Patent
Fan et al.

(10) Patent No.: US 8,605,189 B2
(45) Date of Patent: Dec. 10, 2013

(54) PRODUCT IDENTIFICATION USING MOBILE DEVICE

(75) Inventors: Zhigang Fan, Webster, NY (US);
Yonghui Zhao, Penfield, NY (US);
Shen-ge Wang, Fairport, NY (US);
Hengzhou Ding, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/461,014

(22) Filed: May 1, 2012

(65) Prior Publication Data

US 2013/0293734 A1 Nov. 7, 2013

(51) Int. Cl.
*H04N 5/222* (2006.01)
*H04N 7/18* (2006.01)
*H04N 5/228* (2006.01)
*G06K 9/00* (2006.01)
*G06K 9/54* (2006.01)
*G06K 9/60* (2006.01)

(52) U.S. Cl.
USPC ............ 348/333.02; 348/333.01; 348/135; 348/222.1; 382/141; 382/181; 382/305

(58) Field of Classification Search
USPC ............ 348/135, 222.1, 333.01–333.13; 382/181, 209–223, 305, 306, 100–154
See application file for complete search history.

(56) References Cited

U.S. PATENT DOCUMENTS

| | | | |
|---|---|---|---|
| 6,542,625 B1 * | 4/2003 | Lee et al. | 382/118 |
| 8,499,109 B2 * | 7/2013 | Nakama | 710/74 |
| 2003/0007077 A1 * | 1/2003 | Maggi | 348/223.1 |
| 2003/0034387 A1 * | 2/2003 | Knowles et al. | 235/375 |
| 2004/0085470 A1 * | 5/2004 | Miyashita | 348/333.11 |
| 2005/0002715 A1 | 1/2005 | Fries et al. | |
| 2009/0319388 A1 * | 12/2009 | Yuan et al. | 705/26 |
| 2010/0156919 A1 | 6/2010 | Bala et al. | |
| 2010/0250588 A1 * | 9/2010 | Kita | 707/769 |
| 2010/0329547 A1 * | 12/2010 | Cavet | 382/164 |
| 2011/0025873 A1 * | 2/2011 | Wang et al. | 348/222.1 |
| 2011/0234834 A1 * | 9/2011 | Sugimoto | 348/222.1 |
| 2011/0298204 A1 * | 12/2011 | Eschbach | 283/67 |
| 2012/0039514 A1 * | 2/2012 | Sun et al. | 382/118 |
| 2012/0189190 A1 | 7/2012 | Bala et al. | |
| 2013/0035081 A1 * | 2/2013 | Sanger | 455/414.2 |
| 2013/0094715 A1 * | 4/2013 | Benkley et al. | 382/107 |
| 2013/0183022 A1 * | 7/2013 | Suzuki et al. | 386/241 |
| 2013/0198186 A1 * | 8/2013 | Parakhin et al. | 707/737 |

OTHER PUBLICATIONS

Optical Object Recognition and Feature Mapping by Mobile Devices, NineSigma Request for Proposal, Request #67653, printed from internet Apr. 30, 2012.
Nine Sigma Request for Proposal #67653, "Optical Object Recognition and Feature Mapping by Mobile Devices", 2011, 2 pp.

* cited by examiner

*Primary Examiner* — Chia-Wei A Chen
(74) *Attorney, Agent, or Firm* — Fox Rothschild LLP

(57) ABSTRACT

A method and apparatus for obtaining an image and providing one or more document files to a user. The method may include capturing an image of a target object using an imaging device of an electronic device, analyzing the image to identify a plurality of features and feature locations on the target object with a processor using an image recognition application, accessing a model database to identify an appliance model having features and feature locations that match the identified features and feature locations from the image, retrieving one or more document files that correspond to the identified model from a file database, and providing the one or more document files to a user.

20 Claims, 6 Drawing Sheets

PRODUCT IDENTIFICATION USING MOBILE DEVICE

BACKGROUND

When household appliances such as kitchen appliances and laundry machines, or consumer electronics such as stereo systems and televisions are sold, the products are typically accompanied by documentation, such as one or more instruction manuals. This documentation can be rather lengthy, and it results in increased costs and resources to produce. In a desire to reduce costs and use less resources, many appliance manufacturers forego the paper-based documentation and instead post them as a file on the Internet, such as on the manufacturer's website. However, due to confusing websites that can sometimes be difficult to navigate, as well as product numbers that can resemble an unorganized jumble of letters and numbers, consumers can be confused when trying to locate an electronic version of an appliance's manual online.

Accordingly, it would be beneficial to provide systems and methods that provide solutions to this problem, and that may also provide additional benefits.

SUMMARY

In an embodiment, a method of obtaining an image and providing one or more document files to a user is disclosed. The method may include capturing an image of a target object using an imaging device of an electronic device, analyzing the image to identify a plurality of features and feature locations on the target object with a processor using an image recognition application, accessing a model database to identify an appliance model having features and feature locations that match the identified features and feature locations from the image, retrieving one or more document files that correspond to the identified model from a file database, and providing the one or more document files to a user.

In another embodiment, an electronic device is disclosed. The electronic device may have an imaging device, a processor, a display, and a computer readable memory. The computer readable memory may contain a model identifying application that contains instructions to direct the processor to cause the imaging device to receive an image of the target object, cause the display to display the image, identify a plurality of features and feature locations on the target object, access a model database to identify a model having features and feature locations that match the features and feature locations on the target object, retrieve one or more files from a file database that correspond to the identified model, and provide the one or more files to a user.

In another embodiment, a computer program product is disclosed. The computer program product may include instructions for a processor of an electronic device. The electronic device may also include an imaging device, a processor, a display, and a computer-readable memory. The instructions for the processor may include instructions for causing the imaging device to capture an image of a target object, causing the processor to use an image recognition application to analyze the image to identify a plurality of features and feature locations, causing the processor to access a model database to identify a model having features and feature locations that match the features and feature locations of the image, causing the processor to retrieve one or more files corresponding to the identified model, and causing the processor to provide the one or more files to a user.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

For the purposes of this document, an "electronic device" refers to a device that includes a processor and tangible, computer-readable memory. The memory may contain programming instructions that, when executed by the processor, cause the device to perform one or more operations according to the programming instructions. Examples of electronic devices include personal computers, gaming systems, televisions, and portable electronic devices such as smartphones, personal digital assistants, cameras, tablet computers, laptop computers, GPS navigation devices, media players and the like.

Figure 1:
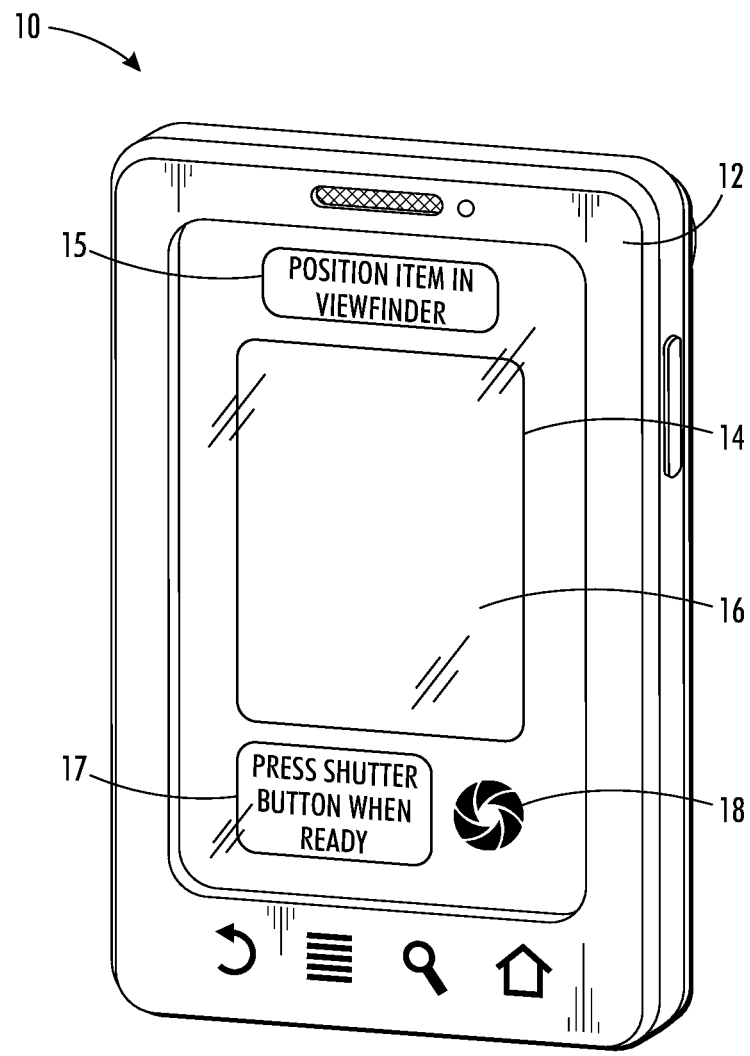
FIG. 1 depicts a perspective front view of an electronic device in accordance with the present disclosure.

FIG. 1 shows an example of an electronic device in accordance with the present disclosure, generally designated 10. The electronic device 10 may include a front face 12 and a display 14. The display 14 may be any suitable component for displaying images, including, but not limited to, electroluminescent displays, electronic paper displays, vacuum fluorescent displays, light emitting diode (LED) displays, cathode ray tube (CRT) displays, liquid crystal (LCD) displays, plasma display panels, digital light processing (DLP) displays, and organic light-emitting diode (OLED) displays. The device 10 and/or the device's display 14 may further include a user interface such as a keypad, one or more switches or buttons, and/or a touch sensitive screen 16, including, but not limited to, a resistive touchscreen, a capacitive touchscreen, or an infrared touchscreen. The device 10 and/or its user interface may include information fields 15, 17 that provide information and/or instructions to the user, as well as one or more activation elements 18 such as a button to activate a shutter of an imaging device.

Figure 2:
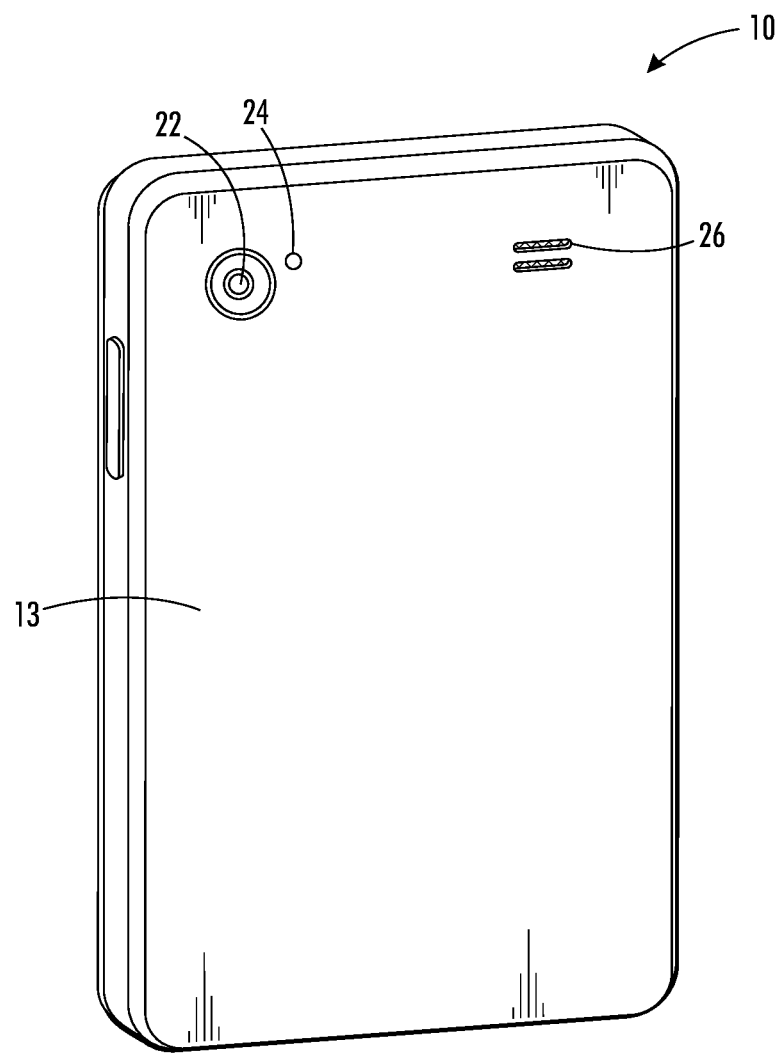
FIG. 2 depicts a perspective rear view of an electronic device in accordance with the present disclosure.

FIG. 2 shows a rear face 13 of electronic device 10. The rear face 13 may include an imaging device 22, an optional flash 24, and an optional audio input/output component 26.

The imaging device 22 may be any suitable component capable of receiving an optical image and transmitting the image information to other components of the electronic device 10 for processing. The imaging device 22 may further have an ability to adjust its focal length and aperture in such a manner that would allow it to zoom and properly focus upon an intended object to be imaged. Such ability may be through mechanical components (such as an optical zoom) or programming (such as a digital zoom). This adjustment may define an "optimal focal distance," or a range of distances in which the electronic device 10 may be properly positioned from the intended object to be imaged to achieve a clear image.

While the imaging device 22 is depicted on the rear face of the present example, persons skilled in the art will appreciate that the imaging device 22 may be positioned at any location upon any face of the electronic device 10, or may even be external to the electronic device 10 and connected by any means of electronic communication, including, but not limited to, physical cable communication such as universal serial bus (USB), wireless radio communication, wireless light communication, or near field communication technology.

The optional flash 24 may be utilized in any light conditions to assist the imaging device 22 in completing any of the tasks described herein. Additionally, the flash 24 may be independently activated to turn on or off at specific points in time, such as when additional lighting is necessary to capture an ideal image. Other features of the flash 24 may include dimming, strobe, constant on, and the like.

The optional flash 24 may contain any suitable light source capable of providing illumination, including, but not limited to, magnesium-based flashes, xenon-based flashes, fulminate-containing flashes, light-emitting diode (LED) flashes, and the like. While the present figure depicts the flash 24 as being integrated with the electronic device 10, it may be appreciated that the flash 24 may be a separate component communicating with the electronic device 10, such as USB based flashes, hot shoe based flashes, remote slave flash units, or other similar devices.

The optional audio input/output 26 may be adapted to play audio tones and signals. Such audio tones and signals may be used to instruct the user to complete various steps as described herein, and may further indicate to the user that a picture has been taken by emitting a beep, click, or other audio signal.

Additionally, the optional audio input/output 26 may be adapted to receive audio signals. Such audio signals may include, for example, voice commands from a user.

Accordingly, the configuration of the electronic device 10 as shown in FIGS. 1 and 2 is only an example, and persons skilled in the art will appreciate other configurations that are able to achieve a similar overall result.

The steps described herein may be contained within one or more program instructions, software or interactive modules and stored in a memory. One exemplary embodiment may be an image recognition application that contains any or all of the following modules: an image/video capture module, an analysis software/control module, a user interface (UI) module, and a database module.

The database module may contain, or may include instructions to access, a file database and a model database. The file database may generally contain a number of document files relating to specific products as described herein. The products may be consumer electronics such as televisions and stereo equipment, household appliances such as refrigerators and microwave ovens, power tools such as drills or lawn mowers, automobiles or automotive equipment, or any other item of equipment that may be operated by a user, each of which is referred to under the general category of "appliances." The document file will include information about an appliance, in the form of a brochure, a user manual, an instruction manual, a specification sheet, and/or the like.

The model database may generally contain information about models of target objects as described herein. Model information may include any information that may identify a specific model. Examples of model information may include photographs, diagrams, CAD models, design details, blueprints, serial numbers, and the like. The database module may be accessed to obtain data, information or files from either the file database, the model database, or both databases.

The document file or files may relate to the model information by use of one or more specific identifiers. Examples of specific identifiers may include serial numbers, barcodes, symbology, custom uniform resource locators, and the like. Specific identifiers may be physically located on both the document file and the model information as a stamp, tag, sticker, printout, and the like. Furthermore, the database module may include a spreadsheet, sub-database or other means of storing information relating to the type of specific identifier used on each model and document file, as well as the location and/or placement of the specific identifier. The database module may be accessed to obtain the specific identifier information, so as to assist other processes in locating and identifying an appliance or a document file, as described herein.

Figure 3:
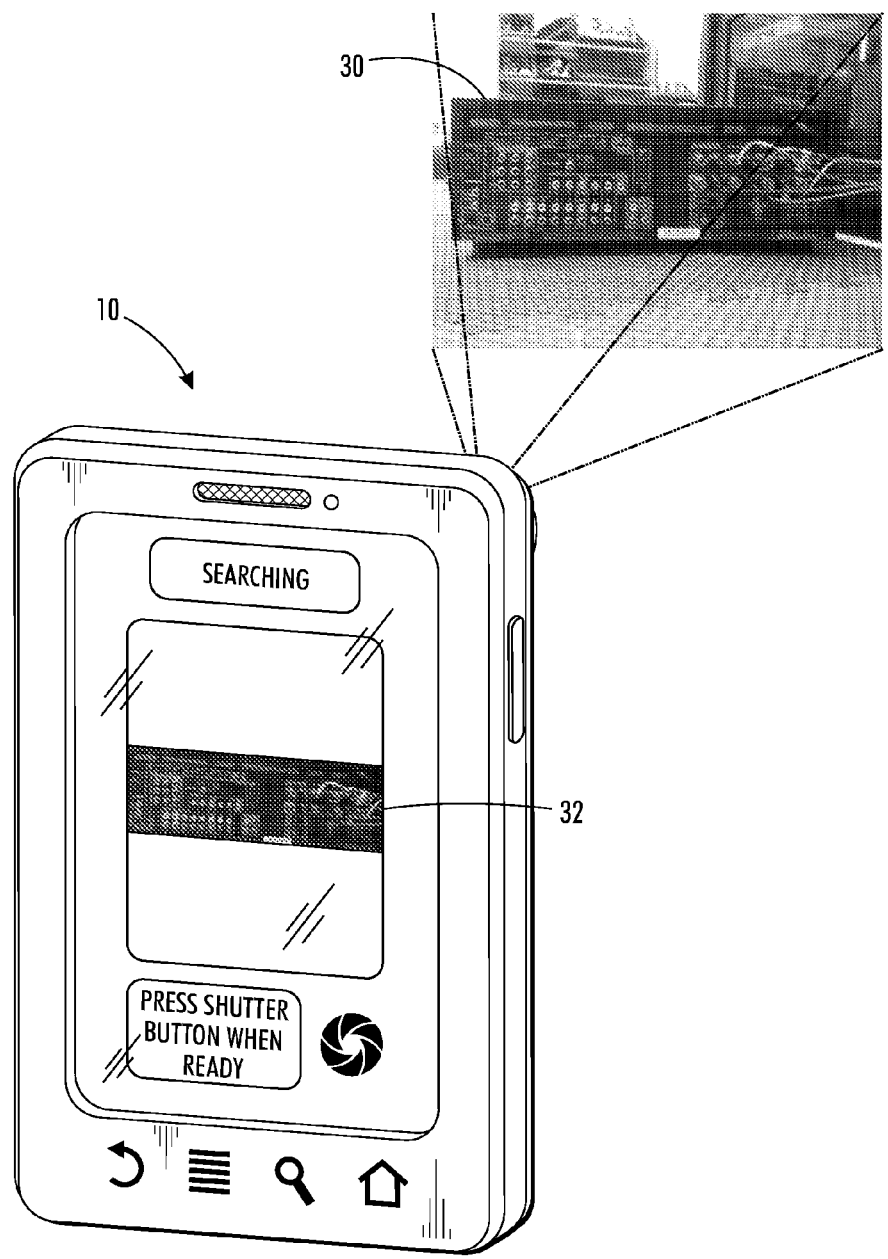
FIG. 3 depicts an electronic device as positioned to view a target object and display an image of the target object on the screen.

The electronic device 10 may be used to image a target object 30, as shown in FIG. 3. The electronic device 10 may be positioned so that the imaging device is facing the target object 30 desired to be imaged. The imaging device may be activated to view the target object 30, wherein the electronic device 10 may capture and process an image 32 of the target object 30. Optionally, the image may be outputted upon the display 14 by use of the image/video capture module.

The target object 30 may generally be any object that is typically sold with some form of documentation, such as a user manual or a warranty statement. Examples of target objects may include, but are not limited to, household appliances, consumer electronics, furniture, toys, or motor vehicles.

The size of the image 32 may be constant and generally may not change. However, the portion of the target object 30 shown in the image 32 upon the display 14 may be increased by moving the electronic device 10 closer to the target object 30. Similarly, the portion of the target object 30 shown in the image 32 may be decreased by moving the electronic device 10 farther away from the target object 30.

As an alternative to moving the electronic device 10 with respect to the target object 30, the imaging device 22 may mechanically adjust its focal length by moving a lens component closer to or farther away from an imaging device. The adjustment may be controlled manually by a user, or may be controlled electronically.

Additionally, the imaging device 22 may mechanically adjust its aperture by expanding or narrowing an opening in the imaging device 22 so as to allow an amount of light to pass through. The imaging device 22 may use a diaphragm to achieve the expansion or narrowing of the opening. The adjustment may be controlled manually by a user, or may be controlled electronically.

Electronic control of the adjustments described above may include the use of a series of switches, toggles, and the like that are manipulated by a user. Alternatively, electronic control of the adjustments may be a series of switches, toggles, and the like that are manipulated via programming instructions that may be contained in instructions, software, or interactive modules.

Mechanical adjustments as described herein may allow the imaging device 22 to zoom in or out upon the target object 30, and may further allow the imaging device 22 to focus upon the target object 30 to ensure that the image 32 presented on the display is crisp, easily viewable, and not blurry.

As another alternative to the above, the portion of the target object 30 shown in the image 32 may be increased or decreased by adjusting a digital zoom of the imaging device 22. The digital zoom may be adjusted by cropping an image down to a centered area and interpolating the resulting image back up to the original pixel dimensions. Optical image adjustment may not be necessary when adjusting the digital zoom, but it may be appreciated that the two can be used in conjunction with each other.

The electronic device 10 may complete an initial image analysis by using the analysis/control module in conjunction with the database module. Either module may be contained within the memory of the electronic device 10, may be stored on a remote server accessible via the Internet or an intranet, or any combination thereof. Either module may further be modifiable to include new products as they become known and/or available, or to reflect previously unknown changes or errors.

The electronic device 10 may access the database module to obtain product model information and object information, which may include three dimensional models and two dimensional views. Object information may be features and feature locations that include text, logos and components on the device, such as knobs, receptacles and electronic displays.

During this initial image analysis, the imaging device 22 may obtain the image 32 or a series of images. The imaging device 22 may obtain the image 32 as part of a feedback loop that may capture and analyze images in an adaptive and interactive manner. The feedback loop may allow the imaging device 22 to obtain as many images as necessary, as well as make adjustments as described herein, to obtain one or more matches between the image 32 and a model from the database module.

Figure 4:
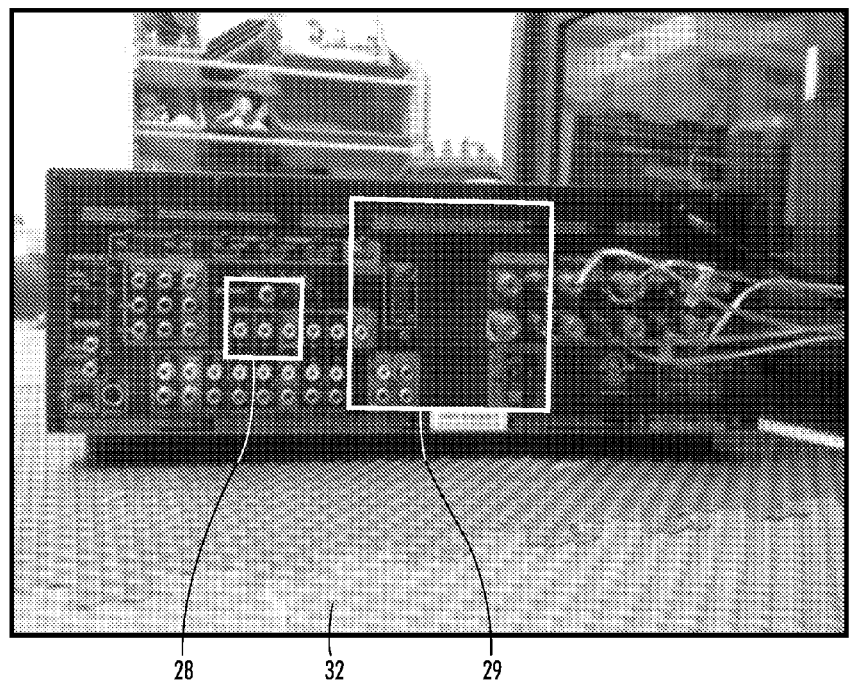
FIG. 4 depicts an example of an image captured by the electronic device described in FIG. 3 in accordance with the present disclosure.

The feedback loop may be adapted to obtain information about the appliance in the image 32, compare that information with information from the database module regarding a general subset of appliances containing similar features, obtain information from the database module regarding locations of specific features on some or all of the appliances from the general subset, and then seek those locations of specific features within the appliance in the image 32 by measuring distances between objects in the image 32, locating points of interest, recognizing relative locations, and the like. For example, if the imaging device 22 obtains an image 32 of a rear panel of an appliance, as shown in FIG. 4, it may compare the general layout of the rear panel, or optionally a portion of the rear panel, such as the portion bounded by the larger box 29 to information in the database module. The feedback loop may identify within the database module a general subset of appliances that contain similar features, such as, for example in FIG. 4, stereos or a specific brand of stereo. The database module may contain information regarding locations of specific features that vary between different stereos in the subset, such as the portion bounded by the smaller box 28. The feedback loop may seek the location of the portion bounded by the smaller box 28 and determine whether the appliance in the image 32 matches any of the appliances obtained from within the subset.

Referring back to FIG. 3, the video/capture module may process the image 32 to normalize it in such a way that distortion is corrected and/or the image 32 is cropped to eliminate background objects or other objects that may cause errors during the analysis and comparison step as described herein.

Optionally, this initial image analysis process may be generally completed in as broad a manner as possible. Accordingly, the initial image analysis may involve viewing a target object 30 as a whole. This task may identify a type of product or a category of product. The result may be a subset of matching products, which may include one or more potential possibilities. However, it may be appreciated that no matches may be found by the initial image analysis.

Accordingly, the initial image analysis may not always be successful in identifying one exact matching model to the target object 30. This may be due to any number of factors, such as an improperly focused or positioned imaging device 22, or the possibility that the target object 30 is a global product wherein the product generally looks the same in each global market it is produced, save for a few distinguishing points that may vary from market to market, depending on the needs of that particular market. Examples of distinguishing points may be features and feature locations that include the language of text that is imprinted on the product, varying electrical plugs, varying connectors based on availability in a particular market, and/or the like.

In instances where no match is found, the imaging device 22 may reposition and/or refocus upon the target object 30 to obtain and analyze a new image. The electronic device 10 may instruct the user, by means of audio signals, visual signals, haptic feedback, and/or the like, as well as combinations thereof, to make adjustments to the imaging device 22. Alternatively, as previously described herein, the electronic device 10 may make optical adjustments to reposition and/or refocus upon the target object 30, thus eliminating the need to instruct a user to make adjustments. Examples of optical adjustments may include adjusting the focal length, adjusting the aperture, and the like.

In instances where several potential matches have been found, the electronic device 10 may access the database module to obtain further information relating to the potential features contained on one or more of the potential matches. Information relating to the potential features may include specific types of features, as described herein, as well as the location of features, the size and shape of features, color and/or other similar visual cues. The location of features may be contained as a set of instructions regarding positioning to locate the features, may be a set of coordinates, may include actual measured distances from other objects, such as the edges of the appliance, and/or the like. The electronic device 10 may locate the potential features on the image 32 as described herein, and based upon the types of features and/or their locations, shapes, sizes and the like, determine which one of the several potential matches is an actual match.

Figure 5:
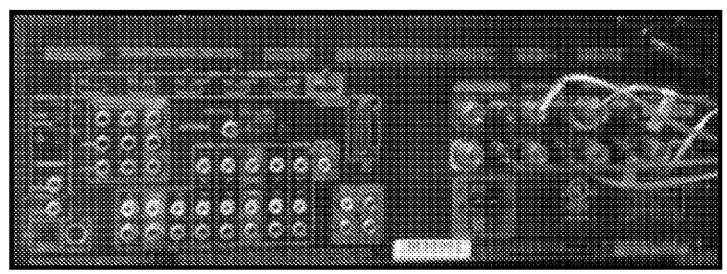
FIG. 5 depicts a perspective rear view of an exemplary target object in accordance with the present disclosure.

As shown in FIG. 5, examples of features that each local iteration of a global product may contain include, but are not limited to, the language of text that is imprinted on the product, varying positions, sizes and/or shapes of electrical ports or plugs, varying connectors based on availability in a particular market, knobs, jacks, ports, buttons, and the like.

Figure 6:
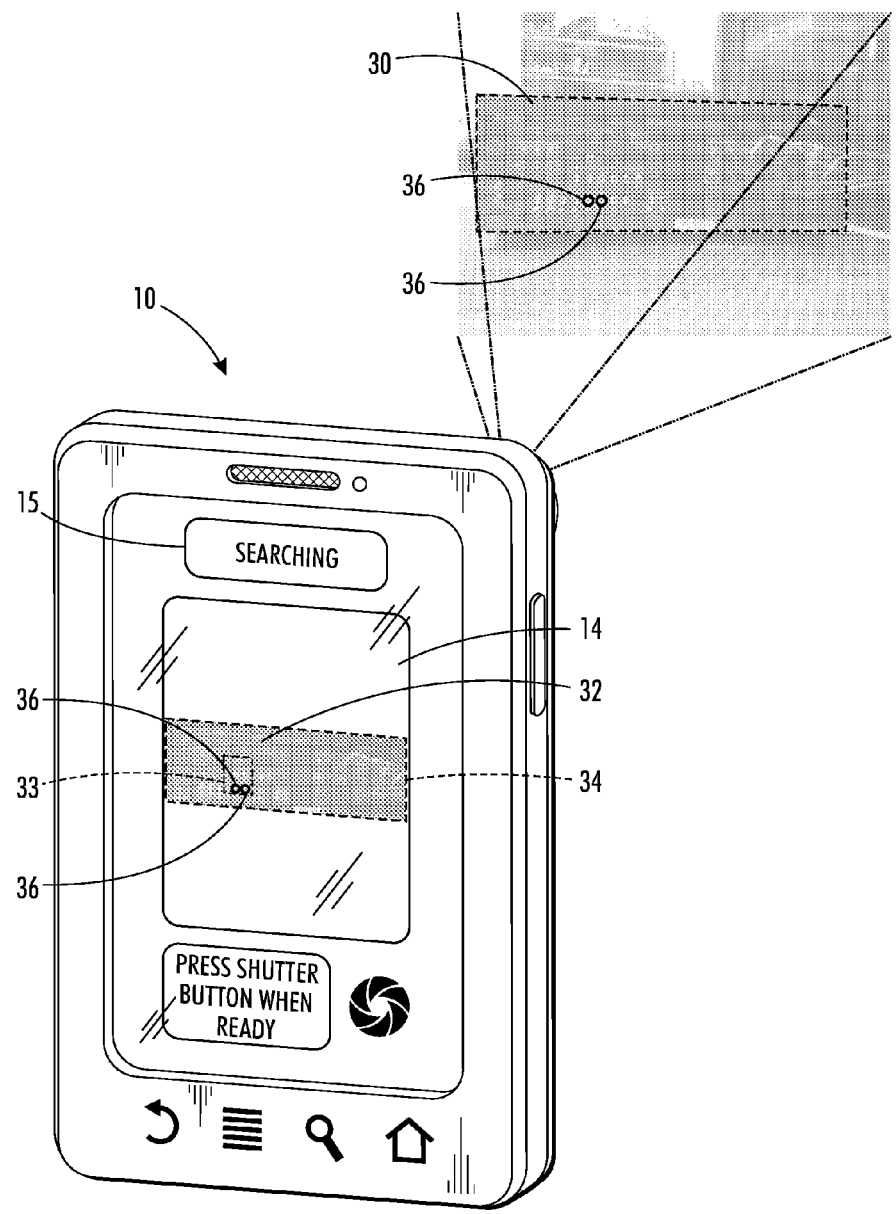
FIG. 6 depicts a flow chart example of a process for receiving an image of a target object and positioning an electronic device to properly analyze the image.

After the initial image analysis step has been completed and a determination has been made that an exact match has not been found, the UI module may direct the display 14 to display one or more boundary indicators 33, 34, as shown in FIG. 6.

The display 14 may display one or more stationary boundary indicators 34 and one or more variable boundary indicators 33. The stationary boundary indicator 34 may be a graphical representation of the optimal focal distance that can be achieved by the imaging device 22, or may alternatively be a graphical representation of a preferred area of focus on the target object 30. The variable boundary indicator 33 may represent one or more bounded areas containing any number of potential distinguishing points 36.

The optimal focal distance that can be achieved by the imaging device 22 may generally be a range of distances in which the electronic device 10 may be properly positioned from the intended object to be imaged to achieve a clear image.

The boundary indicators 33, 34 may be displayed on the display 14 in such a manner that they can be used as a tool by the user or the analysis/control module. The boundary indicators 33, 34 may further be generated by the UI module. The boundary indicators 33, 34 may be positioned at any suitable location upon the display 14. Whereupon a user alters the zoom factor, the size of the variable boundary indicator 33 may be adjusted in a proportional manner.

When the analysis/control module accesses the database module and determines that distinguishing points 36 may exist on the target object 30, the analysis/control module may then map the potential locations of the distinguishing points 36 and attempt to locate them on the target object 30. These locations may be indicated by a variable boundary indicator 33 on the display 14 whenever the area containing the locations appear in the displayed image 32. Instructions may be given to the user to match the stationary boundary indicator 34 on the device with the variable boundary indicator 33 on the area containing potential distinguishing features to determine whether the target object 30 actually contains those distinguishing features.

The matching process between the multiple boundary indicators 33, 34 may involve moving the device 10 with respect to the target object 30, or by using a zoom function on the imaging device 22, as described herein, until the display 14 shows the stationary boundary indicator 34 overlapping the variable boundary indicator 33. For example, the user may be instructed to reposition the electronic device 10 so as to change the location or dimensions of the variable boundary indicator 33.

The corresponding sizes and positions of each boundary indicator 33, 34 may be an exact match, or may fall within an acceptable size range as determined by the software program. Such an acceptable size range may allow each boundary indicator 33, 34 to be a certain size larger or smaller than the other, and still be deemed to "correspond" with or "match" the other. The software program may also deem each boundary indicator 33, 34 to be an "exact match" even when one of the boundary indicators 33, 34 appears just outside or just inside of another. For example, a match may occur when the variable boundary indicator 33 has an edge that is positioned to overlap with, or within a minimum distance from, the stationary boundary indicator 34.

While this embodiment depicts a singular variable boundary indicator 33, it can be appreciated that multiple areas on a target object 30 containing potential distinguishing points 36 may necessitate the need for multiple variable boundary indicators.

If the imaging device 22 is unable to properly view the target object 30, the software application may display a notification 15 the user to reposition the device 10 in such a way that the imaging device 22 is able to properly zoom or focus upon the target object 30. Such a notification may be a text box or image shown upon the display 14, audio signals, haptic feedback and the like, or any combination thereof.

Figure 7:
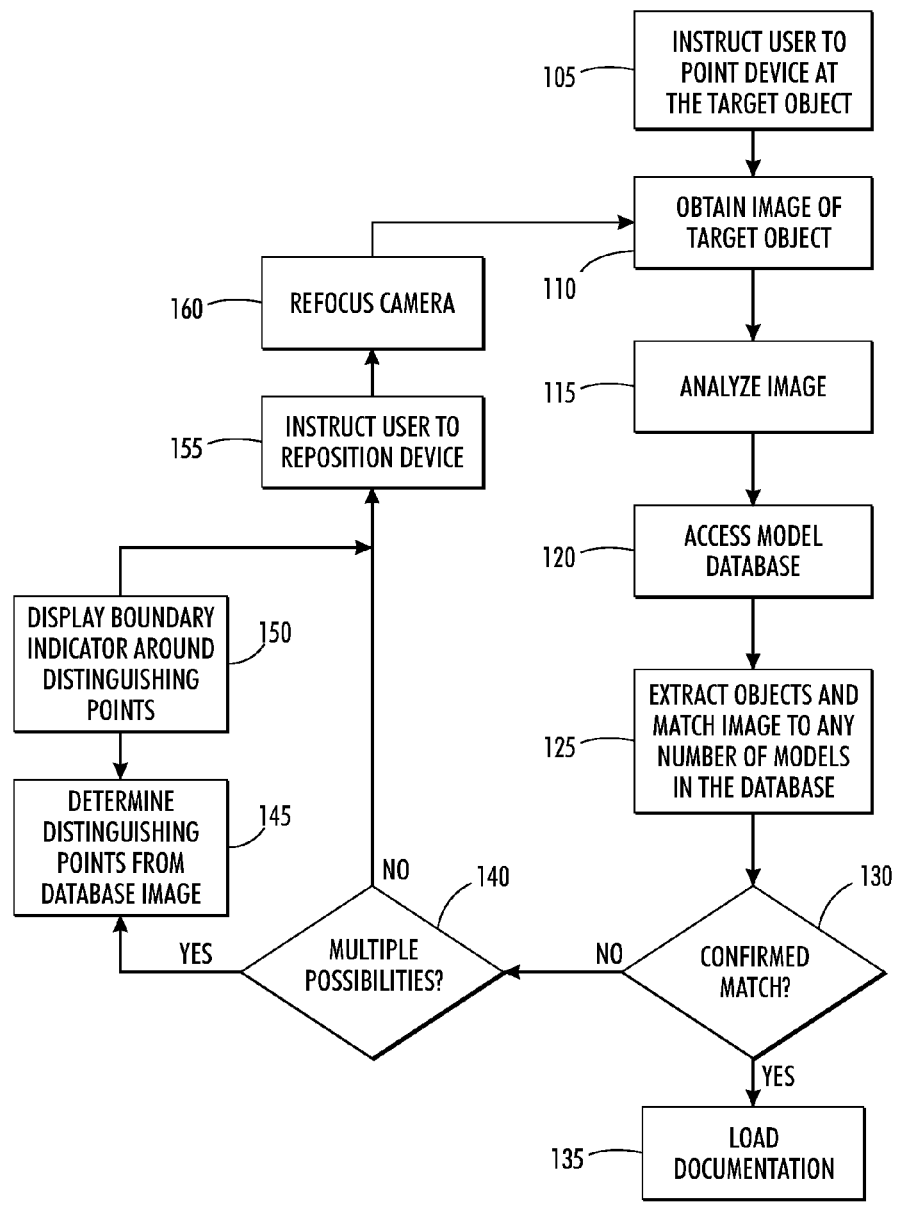
FIG. 7 depicts a flow chart example of an alternative process for receiving an image of a target object and positioning an electronic device to properly analyze the image.

A process of obtaining an image of a target object and identifying the target object according to one embodiment is shown in FIG. 7. First, the device may prompt the user to point the device at a target object 105. Once the user has pointed the device at a target object, the device may obtain one or more images of the target object 110 by utilizing the feedback loop, as described herein.

The device may implement programming instructions that cause the processor to analyze the image 115 and access a model database 120. Analysis of the image may involve locating portions of the image containing identifying information regarding a general subset of appliances and/or identifying information regarding a specific type of device. Analysis may involve using the feedback loop, as described herein. The model database may be resident within the memory of the device, or may be accessed by the device from an external server via a communications network such as the internet or an intranet.

The device may then implement programming instructions to extract data for one or more reference objects from the obtained and analyzed image, such as specific markers in the picture, and match those markers to any number of models in the database 125. Such models may include data relating to reference objects, and may be in the form of images, blueprints, CAD drawings, and/or the like. Reference objects may be positions, sizes and/or shapes of knobs, buttons, ports, plugs, labels, text, or other features of the target object as further described herein. A match occurs if the reference objects in the obtained image match the reference objects of the model. A "match" as used herein may include an exact match or a close match, wherein a close match may be defined as positions, shapes and/or sizes of the reference objects in the obtained image that fall within an acceptable range similar to the positions, shapes and/or sizes found of the reference objects in the models.

If a single matching model is found in the database 130, the device may complete additional tasks, such as accessing a documentation database and identifying a document that corresponds to the matching model. It may then load the identified documentation onto the device 135 using a data connection. Documentation may be in the form of manuals, user guides, warranty registration cards, photographs, diagrams, and/or the like.

If a single matching model is not found in the database, the device may determine whether multiple matching models are found, or if no matching models are found 140. If more than one matching model is found, the device may determine and locate one or more potential features from the database images 145 and display a boundary indicator on the displayed image corresponding to those potential distinguishing points 150. The device may then instruct the user to reposition the device 155 and/or refocus the imaging device 160 so that it can be determined if distinguishing points exist within the bounded areas. Instructions for repositioning may include providing graphical components on the display, such as text, images, icons and/or the like, audio components such as verbal prompts, a series of beeps and/or tones, and/or haptic components such as vibrations. The user may reposition and/or refocus the device according to the instructions received, so that the device is positioned relative to the device in such a way that the device may determine whether potential features exist, as described herein. The process may repeat if the device determines that potential features do not exist in the area that is being imaged, as further described herein.

Alternatively, if no matching models are found 140, the device may skip the boundary indicating steps and instruct the user to reposition the device 155 and refocus the imaging device 160. The process may then repeat 110 one or more times until a matching model is found. Optionally, after a number of times of unsuccessfully being able to find a matching model, the device may provide a notification to the user that the target object cannot be identified. The notification may include, but is not limited to, graphical displays, audio tones, and/or haptic feedback emissions.

The process described above may be contained as program instructions, software or interactive modules and may further be stored in the memory. The processes may be accessed from the memory and carried out by the processor. For example, the processes may be contained within a software application loaded onto a smartphone, and further adjusted to be carried out by individual components of the smartphone.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method, comprising:
    capturing, by an imaging device of an electronic device, an image of a target object;
    analyzing, by a processor using an image recognition application, the image to identify a plurality of features and feature locations on the target object;
    accessing, by the processor, a model database to identify one or more appliance models, each having features and feature locations that match the identified features and feature locations from the image;
    in response to identifying only one appliance model:
    retrieving, by the processor from a file database, one or more document files that correspond to the identified model, and
    providing the one or more document files to a user; and
    in response to identifying more than one appliance model:
        identifying, by the processor, a potential distinguishing feature,
    displaying, by a display of the imaging device, a bounded area that corresponds to a location of the potential distinguishing feature,
    capturing, by the imaging device, a second image of the target object,
    determining, by the processor, whether a portion of the second image that corresponds to the bounded area comprises the potential distinguishing feature, and
    in response to determining that the bounded area comprises the potential distinguishing feature:
    retrieving, by the processor from the file database, one or more document files that correspond to the identified model, and
    providing the one or more document files to the user.

2. The method of claim 1, wherein the one or more document files comprises at least one of the following: a brochure file, a user manual file, an instruction manual file, and a specification sheet file.

3. The method of claim 1, further comprising:
    before the capturing of the image, directing, by the electronic device, the user to position the electronic device with respect to the target object, wherein the imaging device is proximate to, and facing, the target object.

4. The method of claim 1, further comprising:
    adjusting, by the imaging device, a focal length, wherein the adjusting of the focal length results in a focused image of the target object.

5. The method of claim 1, further comprising:
    adjusting, by the imaging device, an aperture, wherein the adjusting of the aperture results in a focused image of the target object.

6. The method of claim 1, further comprising:
    positioning the electronic device proximate the target object;
    displaying, by the display, the image of the target object;
    displaying, by the display, one or more stationary boundary indicators, wherein the one or more stationary boundary indicators is a graphical representation of an optimal focal distance of the imaging device;
    displaying, by the display, one or more variable boundary indicators, wherein the one or more variable indicators is a graphical representation of one or more bounded areas containing the features or feature locations on the target object, and wherein the one or more variable boundary indicators move and change size about the display in response to movement of the electronic device with respect to the target object;
    directing, by the portable electronic device, the user to reposition the electronic device with respect to the target object so that the one or more stationary boundary indicators substantially matches the one or more variable boundary indicators; and
    whereupon the one or more stationary boundary indicators substantially matches the one or more variable boundary indicators, capturing, by the imaging device, a detailed image of the target object.

7. The method of claim 1, wherein if a model is not identified from the model database, then directing, by the electronic device, the user to reposition the electronic device to identify a second plurality of features and feature locations on the target object.

8. An electronic device, comprising:
    an imaging device;
    a processor;
    a display; and
    a computer-readable memory containing a model identifying application comprising programming instructions that instruct the processor to:
        cause the imaging device to receive an image of a target object,
        cause the display to display the image of the target object,
        identify a plurality of features and feature locations on the target object,
        access a model database to identify one or more models, each having features and feature locations that match the identified features and feature locations of the target object,
    in response to identifying only one model:
    retrieve one or more files from a file database that correspond to the identified model, and
    provide the one or more files to a user, and
    in response to identifying more than one model:
        identify a potential distinguishing feature,
    cause the display to display a bounded area that corresponds to a location of the potential distinguishing feature,
    cause the imaging device to capture a second image of the target object,
    determine whether a portion of the second image that corresponds to the bounded area comprises the potential distinguishing feature, and
    in response to determining that the bounded area comprises the potential distinguishing feature:

retrieving, from the file database, one or more document files that correspond to the identified model, and providing the one or more document files to the user.

9. The electronic device of claim 8, wherein the one or more document files comprises at least one of the following: a brochure file, a user manual file, an instruction manual file, and a specification sheet file.

10. The electronic device of claim 8, wherein the programming instructions further instruct the processor to:

before causing the imaging device to receive an image of the target object, direct the user to position the electronic device with respect to the target object, wherein the imaging device is proximate to, and facing, the target object.

11. The electronic device of claim 8, wherein the imaging device further comprises an adjustable focal length.

12. The electronic device of claim 11, wherein the programming instructions further instruct the processor to:

before causing the imaging device to receive an image of the target object, adjust the focal length, wherein the adjusting of the focal length results in a focused image of the target object.

13. The electronic device of claim 8, wherein the imaging device further comprises an adjustable aperture.

14. The electronic device of claim 13, wherein the programming instructions further instruct the processor to:

before causing the imaging device to receive an image of the target object, adjust the aperture, wherein the adjusting of the aperture results in a focused image of the target object.

15. The electronic device of claim 8, wherein the model identifying application further comprises programming instructions that direct the processor to:

cause the electronic device to direct the user to position the electronic device proximate the target object;

cause the display to display one or more stationary boundary indicators, wherein the one or more stationary boundary indicators is a graphical representation of an optimal focal distance of the imaging device;

cause the display to display one or more variable boundary indicators, wherein the one or more variable indicators is a graphical representation of one or more bounded areas containing the features or feature locations on the target object, and wherein the one or more variable boundary indicators move and change size about the display in response to movement of the electronic device with respect to the target object;

cause the electronic device to direct the user to reposition the electronic device with respect to the target object so that the one or more stationary boundary indicators substantially matches the one or more variable boundary indicators; and whereupon the one or more stationary boundary indicators substantially matches the one or more variable boundary indicators, cause the imaging device to capture a detailed image of the target object.

16. A non-transitory computer program product containing instructions that, when executed, instruct a processor of an electronic device to implement a method, wherein the electronic device includes an imaging device, a processor, a display, and a computer-readable memory, the method comprises:

causing the imaging device to capture an image of a target object;

causing the processor using an image recognition application to analyze the image to identify a plurality of features and feature locations;

causing the processor to access a model database to identify one or more models, each having features and feature locations that match the identified features and feature locations from the image;

in response to identifying only one model:

causing the processor to retrieve one or more files that correspond to the identified model from a file database, and causing the processor to provide the one or more files to a user; and in response to identifying more than one model:

causing the processor to identify a potential distinguishing feature, causing the display to display a bounded area that corresponds to a location of the potential distinguishing feature, causing the imaging device to capture a second image of the target object, causing the processor to determine whether a portion of the second image that corresponds to the bounded area comprises the potential distinguishing feature, and in response to determining that the bounded area comprises the potential distinguishing feature:

causing the processor to retrieve, from the file database, one or more document files that correspond to the identified model, and causing the processor to provide the one or more document files to the user.

17. The computer program product of claim 16, wherein the one or more document files comprises at least one of the following: a brochure file, a user manual file, an instruction manual file, and a specification sheet file.

18. The computer program product of claim 16, wherein the method further comprises:

before causing the imaging device to receive an image of the target object, adjusting a focal length of the imaging device, wherein the adjusting of the focal length results in a focused image of the target object.

19. The computer program product of claim 16, wherein the method further comprises:

before causing the imaging device to receive an image of the target object, adjusting an aperture of the imaging device, wherein the adjusting of the aperture results in a focused image of the target object.

20. The computer program product of claim 16, wherein the method further comprises:

causing the electronic device to direct the user to position the electronic device proximate the target object;

causing the display to display one or more stationary boundary indicators, wherein the one or more stationary boundary indicators is a graphical representation of an optimal focal distance of the imaging device;

causing the display to display one or more variable boundary indicators, wherein the one or more variable indicators is a graphical representation of one or more bounded areas containing the features or feature locations on the target object, and wherein the one or more variable boundary indicators move and change size about the display in response to movement of the electronic device with respect to the target object;

causing the electronic device to direct the user to reposition the electronic device with respect to the target object so that the one or more stationary boundary indicators substantially matches the one or more variable boundary indicators; and whereupon the one or more stationary boundary indicators substantially matches the one or more variable boundary indicators, causing the imaging device to capture a detailed image of the target object.

* * * * *